United States Patent
Zhang et al.

(10) Patent No.: US 9,068,671 B2
(45) Date of Patent: Jun. 30, 2015

(54) AERATED SWIRLING VERTICAL SHAFT WITH DOUBLE VOLUTE CHAMBERS

(75) Inventors: Jianmin Zhang, Chengdu (CN); Weilin Xu, Chengdu (CN); Shanjun Liu, Chengdu (CN); Wei Wang, Chengdu (CN); Jingxue Qu, Chengdu (CN); Jun Deng, Chengdu (CN); Zhong Tian, Chengdu (CN); Jiangang Chen, Chengdu (CN); Gang Lei, Chengdu (CN); Yu Ren, Chengdu (CN)

(73) Assignee: Sichuan University, Chengdu, Sichuan Province (CN)

( * ) Notice: Subject to any disclaimer, the term of this patent is extended or adjusted under 35 U.S.C. 154(b) by 823 days.

(21) Appl. No.: 13/643,775
(22) PCT Filed: Jul. 28, 2010
(86) PCT No.: PCT/CN2010/075520
§ 371 (c)(1),
(2), (4) Date: Oct. 26, 2012
(87) PCT Pub. No.: WO2011/012078
PCT Pub. Date: Feb. 3, 2011

(65) Prior Publication Data
US 2013/0068332 A1   Mar. 21, 2013
US 2013/0276926 A9   Oct. 24, 2013

(30) Foreign Application Priority Data

Jul. 28, 2009  (CN) .......................... 2009 1 0060125

(51) Int. Cl.
*F15C 1/02* (2006.01)
*F16L 9/00* (2006.01)
(Continued)

(52) U.S. Cl.
CPC .............. *F16L 9/00* (2013.01); *Y10T 137/2087* (2015.04); *E02B 9/06* (2013.01); *F03B 11/002* (2013.01); *Y02E 10/226* (2013.01); *F03B 13/105* (2013.01); *Y02E 10/22* (2013.01)

(58) Field of Classification Search
CPC .............. F16L 9/00; F16L 9/006; E02B 9/06; E02B 8/06; E02B 3/10; Y10T 29/49826; Y10T 29/49318; Y10T 29/49336; Y10T 29/494; F15D 1/0015; F03B 11/002; F03B 13/105; Y02E 10/226; Y02E 10/22

USPC ............... 137/808, 806, 13, 236.1, 561 A; 405/133, 36, 39; 138/37, 39, 177
See application file for complete search history.

(56) References Cited

U.S. PATENT DOCUMENTS 1,840,205 A * 1/1932 Kinzie et al. .................... 405/88
2,529,141 A * 11/1950 Danel ........................... 405/108
(Continued)

FOREIGN PATENT DOCUMENTS

CN   101215380 A   7/2008
CN   101280557 A   10/2008
(Continued)

OTHER PUBLICATIONS

Dong Xinglin et al. Study on Transferring Diversion Tunnels into Vortex Type of Vertical Shaft Spillways, Water Power, Mar. 31, 1995, No. 3, pp. 32-27, ISSN.
(Continued)

*Primary Examiner* — Craig Schneider
*Assistant Examiner* — Minh Le
(74) *Attorney, Agent, or Firm* — McGarry Bair PC

(57) ABSTRACT

An aerated swirling vertical shaft with double volute chambers comprises an upper volute chamber (2) and a first shrinking section (3) beneath the upper volute chamber (2), a venting passage (4) outside the upper volute chamber (2), a vertical shaft section (7) beneath the first shrinking section (3), as well as an aerated lower volute chamber (5) and a second shrinking section (6) communicated with the aerated lower volute chamber (5) between the first shrinking section (3) and the vertical shaft section (7), wherein the upper end of the aerated lower volute chamber (5) is connected with the first shrinking section (3), the lower end of the second shrinking section (6) is connected with the vertical shaft section (7); the upper end of the venting passage (4) is communicated with the atmosphere and the lower end is communicated with the aerated lower volute chamber (5). The water stream in the vertical shaft can be discharged smoothly and the wall surface of the vertical shaft may avoid being destroyed due to cavitation and cavitation erosion.

10 Claims, 3 Drawing Sheets

(51) Int. Cl.
  *E02B 9/06* (2006.01)
  *F03B 11/00* (2006.01)
  *F03B 13/10* (2006.01)

(56) References Cited

U.S. PATENT DOCUMENTS

| | | | | |
|---|---|---|---|---|
| 3,502,103 | A * | 3/1970 | Verschuur | 137/565.33 |
| 3,701,260 | A * | 10/1972 | Soileau | 405/40 |
| 3,960,653 | A * | 6/1976 | Futcher et al. | 162/264 |
| 3,993,097 | A * | 11/1976 | Verschuur | 137/896 |
| 4,190,070 | A * | 2/1980 | Bauer | 137/15.16 |
| 4,352,593 | A * | 10/1982 | Iskra et al. | 405/108 |
| 4,702,830 | A * | 10/1987 | Makino et al. | 210/220 |
| 4,714,522 | A * | 12/1987 | Holik | 162/264 |
| 4,762,148 | A * | 8/1988 | Marui et al. | 137/808 |
| 4,801,090 | A * | 1/1989 | Yoshida et al. | 239/290 |
| 5,360,290 | A * | 11/1994 | Yamada et al. | 405/52 |
| 5,487,621 | A * | 1/1996 | Takada et al. | 405/80 |
| 6,106,729 | A * | 8/2000 | Prince et al. | 210/747.5 |
| 7,887,258 | B2 * | 2/2011 | Rubbert | 405/81 |
| 2010/0096138 | A1 * | 4/2010 | Hermes et al. | 166/302 |
| 2013/0327059 | A1 * | 12/2013 | Richardson | 60/797 |

FOREIGN PATENT DOCUMENTS

| | | |
|---|---|---|
| CN | 101294377 A | 10/2008 |
| CN | 101624819 A | 1/2010 |
| CN | 101812832 A | 8/2010 |

OTHER PUBLICATIONS

Junxia Yan, International Search Report, Sep. 13, 2010, The State Intellectual Property Office, the P.R. China, 6 pages.

* cited by examiner

ABSTRACT
AERATED SWIRLING VERTICAL SHAFT WITH DOUBLE VOLUTE CHAMBERS

CROSS-REFERENCE TO RELATED APPLICATIONS

This application is a National Phase application of International Application No. PCT/CN2010/075520, filed Jul. 28, 2010, which claims the benefit of Chinese Patent Application No. 200910060125.2, filed Jul. 28, 2009, both of which are incorporated herein by reference in their entirety.

TECHNICAL FIELD OF THE INVENTION

The present invention relates to a swirling vertical shaft, which is an energy dissipating facility used for hydraulic and hydropower engineering, in particular to an aerated swirling vertical shaft which is suitable for high head and large discharge.

BACKGROUND OF THE INVENTION

The engineering practice shows that, under the condition of large discharge and high head, the energy dissipation of the swirling vertical shaft encounters the following problems, that is, 1) excessive flow velocity in the vertical shaft increases the risks of cavitation and cavitation erosion on the wall surface; 2) due to the centrifugal force of water stream, it is difficult to perform aeration by using the conventional annular aeration ridge, the function of aeration and cavitation mitigation can not work.

Chinese patent application with publishing No. CN 101294377A provides a swirling vertical shaft provided with an aeration ridge. The aeration ridge is arranged on the wall surface of the lower middle section of the vertical shaft, and formed by gradually shrinking the vertical shaft connecting with the upper flat section of a flood discharging tunnel from the middle part to the lower middle part and then suddenly expanding the wall surface. Compared to the swirling vertical shaft provided with a conventional annular aeration ridge, although the aeration condition of the water stream can be improved to enable near-wall water layer at the lower reaches to become into aerated water streams and mitigate the damage of overflowing section at the lower middle part of the vertical shaft caused by cavitation erosion. However, the swirling vertical shaft of such a structure is only suitable for small discharge for the small volume of the cavity for containing air formed by suddenly expanding makes the amount of air aerated into the water stream small. Under the condition of large discharge and high head, it is difficult to fully aerate the water stream in the vertical shaft, the water stream in the vertical shaft cannot be discharged smoothly, and the concentration of the air mixed in the water stream cannot be increased effectively under the condition of large discharge and high head.

SUMMARY OF THE INVENTION

The objective of the present invention is to overcome the defects of the prior art and provide an aerated swirling vertical shaft with double volute chambers to solve the problem of insufficient aeration on the wall surface caused by a sealed cavity of the swirling vertical shaft under the condition of large discharge and high head, so that the water stream in the vertical shaft can be discharged smoothly and the wall surface of the vertical shaft may avoid being destroyed due to cavitation and cavitation erosion.

The present invention provides an aerated swirling vertical shaft with double volute chambers, comprising an upper volute chamber and a first shrinking section beneath the upper volute chamber, a venting passage outside the upper volute chamber, a vertical shaft section beneath the first shrinking section, and further comprising an aerated lower volute chamber and a second shrinking section communicated with the aerated lower volute chamber between the first shrinking section and the vertical shaft section, wherein the upper end of the aerated lower volute chamber is connected with the first shrinking section, the lower end of the second shrinking section is connected with the vertical shaft section; the upper end of the venting passage is communicated with the atmosphere and the lower end is communicated with the aerated lower volute chamber.

By experiments, the aerated swirling vertical shaft with double volute chambers provided by the present invention preferably adopts the following structural parameters:

1. The diameter $D_1$ of the upper volute chamber is determined according to the flow rate of water stream entering into the vertical shaft, and the aerated lower volute chamber has a diameter $D_2$ which is greater than or equal to the diameter $D_1$ of the upper volute chamber.

2. The length $L_1$ of the upper volute chamber is $2.0 D_1$ to $3.0 D_1$, the ratio of the length $L_2$ of the first shrinking section to the length $L_1$ of the upper volute chamber is 1:2 to 1:1, the gradient $i_1$ of the first shrinking section (3) is 1:15 to 1:10, wherein $D_1$ is the diameter of the upper volute chamber.

3. The length $L_3$ of the aerated lower volute chamber is $0.4 D_2$ to $1.0 D_2$, the ratio of the length $L_4$ of the second shrinking section to the length $L_3$ of the aerated lower volute chamber is 2:1 to 4:1, the gradient $i_2$ of the second shrinking section is 1:15 to 1:10, wherein $D_2$ is the diameter of the aerated lower volute chamber.

The present invention has the following technical effects:

1. Since the aerated lower volute chamber is provided beneath the first shrinking section which is provided beneath the lower part of the upper volute chamber, the air flows through the venting passage and flows into the aerated lower volute chamber. As the aerated lower volute chamber can contain more air to be mixed with the water stream spouted out of the first shrinking section, the content of air entering the water stream in the vertical shaft section is effectively increased, and the problem of insufficient aeration on the wall surface caused by a sealed cavity of the swirling vertical shaft is avoided. The aerated swirling vertical shaft with double volute chambers has more remarkable aeration effects under the condition of large discharge and high head, is capable of fully mixing water and air, increases the content of air in the water stream significantly, stabilizes the water stream form, and further achieves the effect of eliminating the damage on the wall surface of the vertical shaft caused by cavitation erosion, and ensuring the safe operation of the vertical shaft and the flood discharge tunnel.

2. Optimization of structural parameters ensures the stability of aeration and cavitation mitigation effects of the aerated swirling vertical shaft with double volute chambers provided by the present invention.

In these figures, 1-approach channel, 2-upper volute chamber, 3-first shrinking section, 4-venting passage, 5-aerated lower volute chamber, 6-second shrinking section, 7-vertical shaft section, 8-anti-arc section, 9-pressing slope section, 10-flood discharging tunnel, $D_1$-diameter of upper volute chamber, $D_2$-diameter of aerated lower volute chamber, $D_3$-diameter of vertical shaft section, $L_1$-length of upper volute chamber, $L_2$-length of first shrinking section, $i_1$-gradient of first shrinking section, $L_3$-length of aerated lower volute chamber, $L_4$-length of second shrinking section, $i_2$-gradient of second shrinking section, $L_5$-length of vertical shaft section, $L_6$-height from bottom plate of vertical shaft to downstream connection section, $L_7$-length of pressing slope, $i_3$-gradient of pressing slope section, R-radius of anti-arc section, B-width of flood discharging tunnel, H-height of flood discharging tunnel.

DETAILED DESCRIPTION OF THE INVENTION

The embodiments of the present invention will be described in detail below as shown in drawings. The structure of the aerated swirling vertical shaft with double volute chambers of the present invention will be further described below as shown in drawings. The aerated swirling vertical shaft with double volute chambers in the following embodiments is designed based on a flood discharging tunnel in a pivotal project of a certain hydropower station. The flood discharging tunnel of the vertical shaft is of swirling flow internal energy dissipation type, the elevation of the bottom plate of the flood discharging tunnel of the vertical shaft is 2690 m, the elevation of the top is 2852 m, and the flow velocity V of the approach channel is 12 m/s to 20 m/s.

Figure 1:
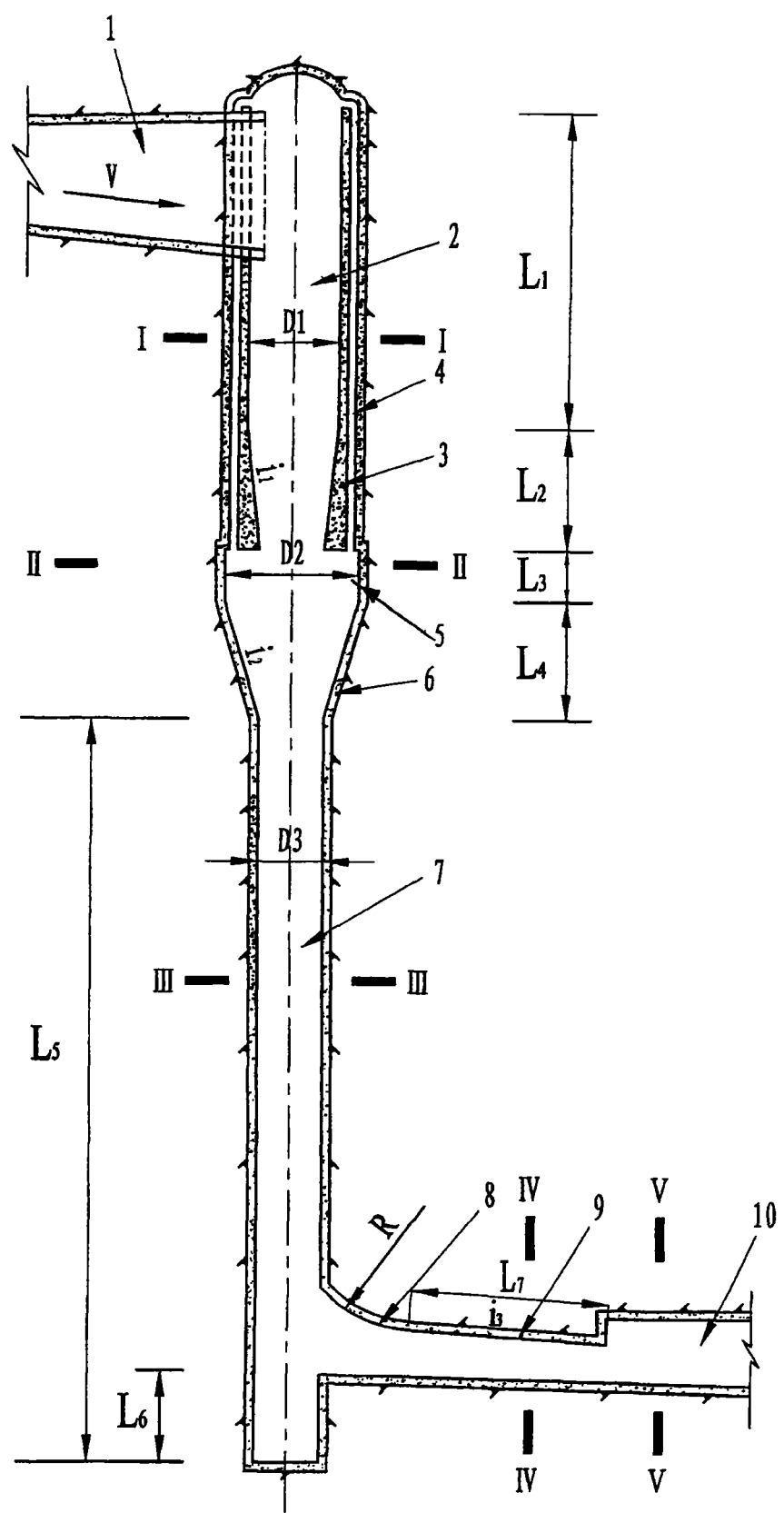
FIG. 1 is a structure diagram of the aerated swirling vertical shaft with double volute chambers according to the present invention (viewed from section VI-VI of FIG. 2)
Figure 2:
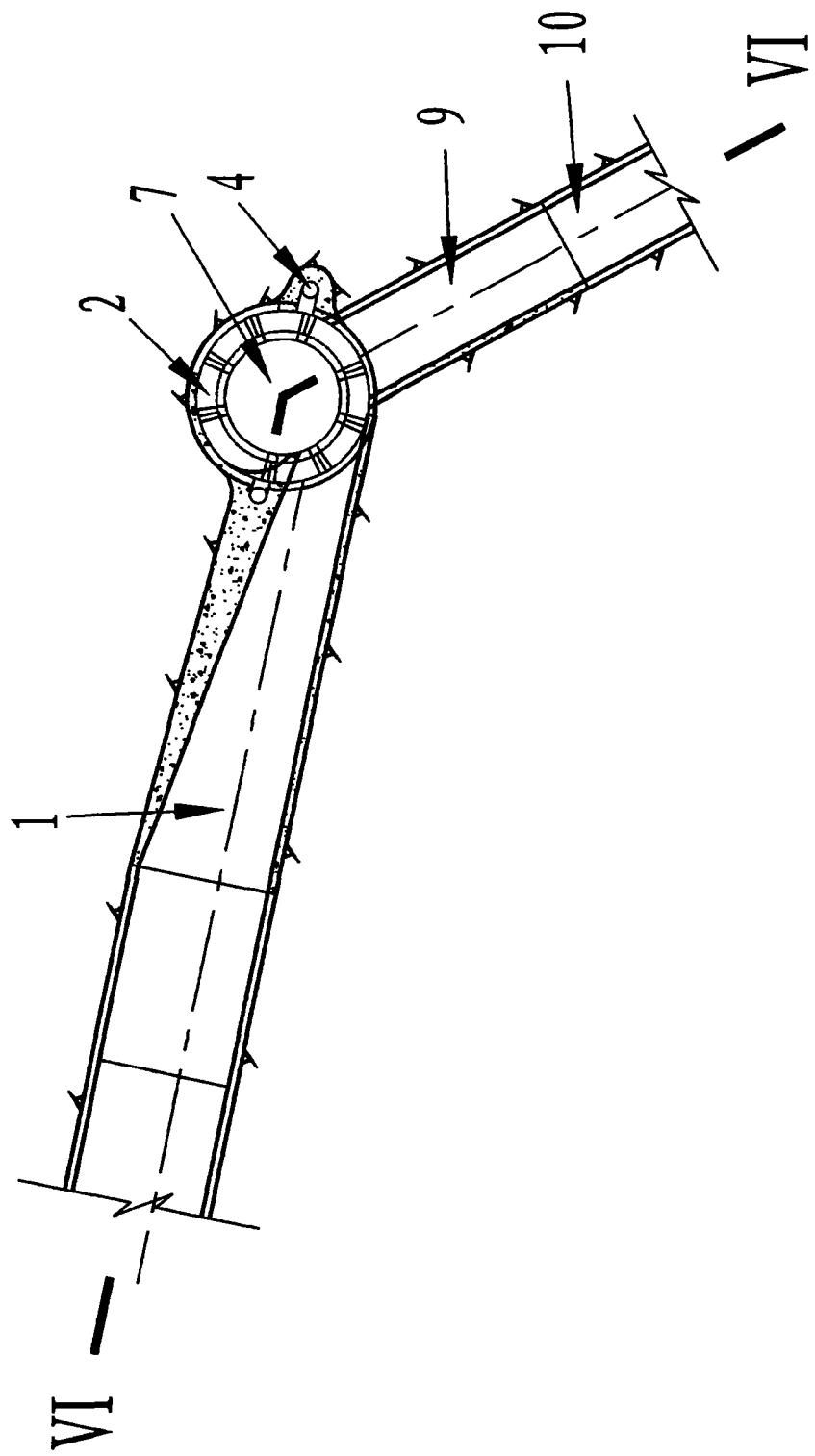
FIG. 2 is a top view of FIG. 1, showing a connection relation between the aerated swirling vertical shaft with double volute chambers and an approach channel, a pressing slope section and a flood discharging tunnel according to the present invention.

Embodiment 1 is described as follows:

In this embodiment, the structure of the aerated swirling vertical shaft with double volute chambers is shown in FIG. 1 and FIG. 2, which comprises an upper volute chamber 2, a first shrinking section 3 beneath the upper volute chamber 2, an aerated lower volute chamber 5, a second shrinking section 6 beneath the aerated lower volute chamber 5, a vertical shaft section 7 and a venting passage 4. The first shrinking section 3 beneath the upper volute chamber is connected with the aerated lower volute chamber 5, and the second shrinking section 6 beneath the aerated lower volute chamber is connected with the vertical shaft section 7. There are two venting passages 4, which are symmetrically installed on the outer walls of the upper volute chamber and the first shrinking section beneath the upper volute chamber. The upper ends of the venting passages are communicated with the atmosphere, and the lower ends are connected with the top of the aerated lower volute chamber. The upper volute chamber 2 is connected with the approach channel 1, and the water stream in the approach channel is introduced into the vertical shaft from the upper volute chamber tangentially. The lower part of the vertical shaft section 7 is communicated with the flood discharging tunnel 10 through the anti-arc section 8 and pressing slope section 9.

It can also be seen from the figure that, both of the upper volute chamber 2 and the aerated lower volute chamber 5 are preferably cylindrical to facilitate the manufacture. The venting passage 4 is designed such that the axial projection of the lower end surface of the venting passage 4 is located within the aerated lower volute chamber, so as to expand the volume for containing air as large as possible. Moreover, a jet flow is formed when the water stream from the upper volute chamber 2 flows through the first shrinking section 3. The volume of the jet flow in the suddenly expanded cylindrical aerated lower volute chamber 5 is small, so the usable volume of the aerated lower volute chamber 5 for containing air from the venting passage is increased. Then, during the advancing process, the jetted water flow diffuses and air aerates in the jetted water flow to form an aerated layer. At the same time, the air is entrapped during the downward process, so that the near-wall water layers at the lower reaches become into aerated water streams, resulting in the air mixing concentration in the water stream being not less than the minimum concentration value effective for corrosion prevention, thereby achieving the improvement in corrosion prevention performance under the condition of high head and of large discharge. It can also be seen from the figure that, the venting passage 4 extends linearly, which makes it easy to manufacture. In this embodiment, two venting passages 4 are taken as an example, which are arranged around the upper volute chamber 2 uniformly. In practical use, the number of the venting passages 4 is not limited to two. The second shrinking section 6 is used for transitionally connecting the cylindrical aerated lower volute chamber 5 and the vertical shaft section 7.

Figure 3:
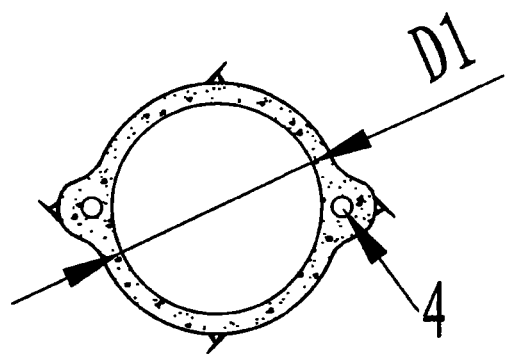
FIG. 3 is a I-I sectional view of FIG. 1, in which the section is the section of an upper volute chamber.
Figure 6:
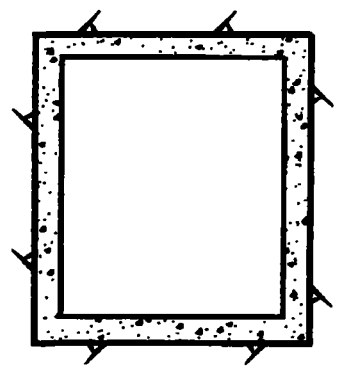
FIG. 6 is a IV-IV sectional view of FIG. 1, in which the section is the section of a pressing slope section.
Figure 4:
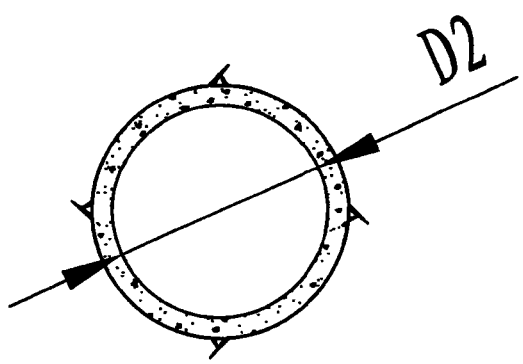
FIG. 4 is a II-II sectional view of FIG. 1, in which the section is the section of an aerated lower volute chamber.
Figure 5:
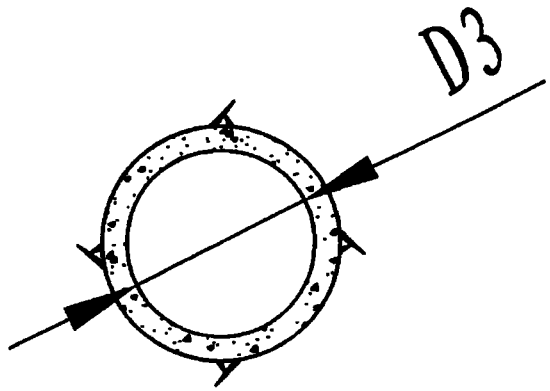
FIG. 5 is a III-III sectional view of FIG. 1, in which the section is the section of a vertical shaft section.
Figure 7:
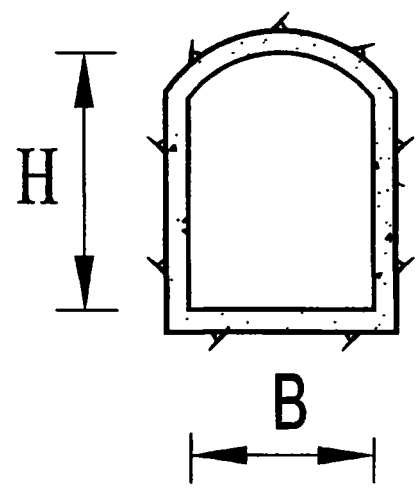
FIG. 7 is a V-V sectional view of FIG. 1, in which the section is the section of a flood discharging tunnel.

In this embodiment, the flow rate of water stream is 400 m³/s, and the aerated swirling vertical shaft with double volute chambers has relevant structural parameters as follows:

The cross section of the upper volute chamber 2 is shown in FIG. 3, in which the diameter $D_1$ is 10 m, and the length $L_1$ is 30 m; the length $L_2$ of the first shrinking section 3 on the lower part of the upper volute chamber is 15 m, and the gradient $i_1$ is 1:10. The cross section of the aerated lower volute chamber 5 is shown in FIG. 4, in which the diameter $D_2$ is 10 m, and the length $L_3$ is 5 m; the length $L_4$ of the second shrinking section 6 on the lower part of the upper volute chamber is 20 m, and the gradient $i_2$ is 1:15. The cross section of the vertical shaft section 7 is shown in FIG. 5, wherein the diameter $D_3$ is 7 m, the length $L_5$ is 92 m, the height $L_6$ from the bottom plate of vertical shaft to the downstream connection section is 10 m, and the radius R of the anti-arc section 8 is 15 m. The cross section of the pressing slope section 9 is shown in FIG. 6, in which the length $L_7$ is 35 m, and the gradient $i_3$ is 1:15. The cross section of the flood discharging tunnel 10 is shown in FIG. 7, in which the width B is 5 m, and the height H is 7 m.

Proved by the experiments, the aerated swirling vertical shaft with double volute chambers according to the embodiment of the present invention has remarkable aeration effects under the condition of large discharge and high head, and is capable of increasing the content of air in the water stream effectively by 4% or more.

Embodiment 2 is described as follows:

In this embodiment, the structure of the aerated swirling vertical shaft with double volute chambers is shown in FIG. 1 and FIG. 2. Its components and connection position of each component are the same as those in Embodiment 1, differing from Embodiment 1 in that the flow rate of water stream in the vertical shaft is 600 m³/s, thereby changing the structural parameters. The aerated swirling vertical shaft with double volute chambers has relevant structural parameters as follows:

The cross section of the upper volute chamber 2 is shown in FIG. 3, in which the diameter $D_1$ is 12 m, and the length $L_1$ thereof is 24 m; the length $L_2$ of the first shrinking section 3 on the lower part of the upper volute chamber is 24 m, and the gradient $i_1$ is 1:12. The cross section of the aerated lower volute chamber 5 is shown in FIG. 4, in which the diameter $D_2$ is 14 m, and the length $L_3$ thereof is 12 m; the length $L_4$ of the second shrinking section 6 on the lower part of the aerated upper volute chamber is 30 m, and the gradient $i_2$ is 1:10. The cross section of the vertical shaft section 7 is shown in FIG. 5, in which the diameter $D_3$ is 8 m, and the length $L_5$ is 72 m, the height $L_6$ from the bottom plate of vertical shaft to the downstream connection section is 10 m, and the radius R of the anti-arc section 8 is 20 m. The cross section of the pressing slope section 9 is shown in FIG. 6, in which the length $L_7$ is 30 m, and the gradient $i_3$ is 1:10. The cross section of the flood discharging tunnel 10 is as shown in FIG. 7, in which the width B is 5 m, and the height H is 7 m.

Proved by the experiments, the aerated swirling vertical shaft with double volute chambers according to the embodiment of the present invention has remarkable aeration effects under the condition of large discharge and high head, and is capable of increasing the content of air in the water stream effectively by 4% or more.

Above contents only describe the preferred embodiments of the present invention and are not intended to limit the present invention; for one skilled in the art, the present invention may have various modifications and changes. Any modifications, equivalent replacements and improvements made within the spirit and principle of the present invention should be included within the protection scope of the present invention.

The invention claimed is:

1. An aerated swirling vertical shaft with double volute chambers, comprising: an upper volute chamber (2) and a first shrinking section (3) beneath the upper volute chamber (2), a venting passage (4) outside the upper volute chamber (2), a vertical shaft section (7) beneath the first shrinking section (3), and further comprising an aerated lower volute chamber (5) and a second shrinking section (6) communicated with the aerated lower volute chamber (5) between the first shrinking section (3) and the vertical shaft section (7), wherein the upper end of the aerated lower volute chamber (5) is connected with the first shrinking section (3), the lower end of the second shrinking section (6) is connected with the vertical shaft section (7); the upper end of the venting passage (4) is communicated with the atmosphere and the lower end is communicated with the aerated lower volute chamber (5).

2. The aerated swirling vertical shaft with double volute chambers according to claim 1, wherein the axis projection of the lower end surface of the venting passage (4) is located within the aerated lower volute chamber (5).

3. The aerated swirling vertical shaft with double volute chambers according to claim 2, wherein the venting passage (4) extends linearly.

4. The aerated swirling vertical shaft with double volute chambers according to claim 3, wherein both the upper volute chamber and the aerated lower volute chamber (5) are cylindrical.

5. The aerated swirling vertical shaft with double volute chambers according to claim 4, wherein there are at least two venting passages (4), which are provided around the upper volute chamber (2) uniformly.

6. The aerated swirling vertical shaft with double volute chambers according to claim 1, wherein a diameter $D_2$ of the aerated lower volute chamber (5) is greater than or equal to a diameter $D_1$ of the upper volute chamber (2).

7. The aerated swirling vertical shaft with double volute chambers according to claim 6, wherein the length $L_1$ of the upper volute chamber (2) is 2.0 $D_1$ to 3.0 $D_1$, the ratio of the length $L_2$ of the first shrinking section (3) to the length $L_1$ of the upper volute chamber (2) is 1:2 to 1:1, the gradient $i_1$ of the first shrinking section (3) is 1:15 to 1:10, wherein $D_1$ is the diameter of the upper volute chamber (2).

8. The aerated swirling vertical shaft with double volute chambers according to claim 7, wherein the length $L_3$ of the aerated lower volute chamber (5) is 0.4 $D_2$ to 1.0 $D_2$, the ratio of the length $L_4$ of the second shrinking section (6) to the length $L_3$ of the aerated lower volute chamber (5) is 2:1 to 4:1, the gradient $i_2$ of the second shrinking section (6) is 1:15 to 1:10, wherein $D_2$ is the diameter of the aerated lower volute chamber.

9. The aerated swirling vertical shaft with double volute chambers according to claim 1, wherein the length $L_1$ of the upper volute chamber (2) is 2.0 $D_1$ to 3.0 $D_1$, the ratio of the length $L_2$ of the first shrinking section (3) to the length $L_1$ of the upper volute chamber (2) is 1:2 to 1:1, the gradient $i_1$ of the first shrinking section (3) is 1:15 to 1:10, wherein $D_1$ is the diameter of the upper volute chamber (2).

10. The aerated swirling vertical shaft with double volute chambers according to claim 9, wherein the length $L_3$ of the aerated lower volute chamber (5) is 0.4 $D_2$ to 1.0 $D_2$, the ratio of the length $L_4$ of the second shrinking section (6) to the length $L_3$ of the aerated lower volute chamber (5) is 2:1 to 4:1, the gradient $i_2$ of the second shrinking section (6) is 1:15 to 1:10, wherein $D_2$ is the diameter of the aerated lower volute chamber.

* * * * *